United States Patent [19]

Schnerk

[11] 4,396,916
[45] Aug. 2, 1983

[54] PSEUDONOISE RADAR

[75] Inventor: Tom Schnerk, Granada Hills, Calif.

[73] Assignee: International Telephone & Telegraph Corp., New York, N.Y.

[21] Appl. No.: 132,420

[22] Filed: Apr. 8, 1971

[51] Int. Cl.[3] ............................................... G01S 13/26
[52] U.S. Cl. ................................. 343/5 PN; 328/155; 328/10; 328/14; 328/7 PL; 328/17.2 PC
[58] Field of Search ............... 343/5 DP, 5 R, 17.2 R, 343/17.5, 5 PN, 7 PL, 17.2 PC; 307/271, 236, 295; 331/4, 10, 14, 25; 328/155

[56] References Cited

U.S. PATENT DOCUMENTS

| | | | |
|---|---|---|---|
| 2,424,796 | 7/1947 | Carlson | 343/17.5 |
| 3,183,506 | 5/1965 | Webb | 343/17.5 X |
| 3,382,497 | 5/1968 | Cooley | 343/17.2 R |
| 3,495,248 | 2/1970 | Raether et al. | 343/5 DP X |
| 3,500,402 | 3/1970 | Huele et al. | 343/5 DP |
| 3,641,573 | 2/1972 | Albanese | 343/5 R X |

Primary Examiner—T. H. Tubbesing

Attorney, Agent, or Firm—T. E. Kristofferson; W. T. O'Neil

[57] ABSTRACT

A continuous wave pseudonoise radar system which employs a large word rate to avoid spillover and other noise. Spillover is the electromagnetic energy that is transmitted from the transmitting antenna directly to the receiving antenna. In other words, the spillover is not reflected from the target. The word frequency is thus made higher than the highest expected doppler. The high word rate would normally cause an ambiguous range indication because the word wavelength would be less than twice the maximum expected target range. However, this problem is solved by the use of coarse and fine range indicators. It is an outstanding feature of this invention that the coarse range is obtained by changing the transmitter bit rate. The difference between transmitter and receiver bit frequencies is then integrated over a selected period. The definite integral is directly proportional to range. However, the range turns out to be a function of the transmitter bit frequency only at the integral limits. Rapid loosely controlled frequency shifts can thus be made to detect accurately the range of supersonic targets.

9 Claims, 8 Drawing Figures

PSEUDONOISE RADAR

BACKGROUND OF THE INVENTION

This invention relates to radar systems, and more particularly, to a noise discriminating, continuous wave (CW), pseudonoise radar.

In the past, the problem of discriminating against spillover and other noise has been recognized. See co-pending application Ser. No. 880,057, now U.S. Ser. No. 3,641,573, filed Nov. 26, 1969, by D. F. Albanese for PSEUDONOISE RADAR SYSTEM and assigned to the assignee of the present application.

In determining the range of a moving target, a CW radar is often used, including a transmitter having a transmitting antenna and a receiver having a receiving antenna. Electromagnetic energy transmitted directly from the transmitter to the receiver is unwanted because the wave reflected from the target is that from which range is determined. This directly transmitted energy is thus noise and is called spillover.

Spillover can be partially attenuated in a pseudonoise radar system by decoding the incoming wave by a code delayed an amount directly proportional to the distance between the transmitting and receiving antennas. Then, by the use of a notch filter or D.C. blocking capacitor, a large portion of the spillover may be suppressed without substantially attenuating the wave reflected by the target.

Notwithstanding the foregoing, enough of the spillover energy is still left and is quite troublesome.

In prior art systems, it has been impossible to separate spillover and other noise from the desired signal other than by the means described above. This has been due to the character of the power spectrum of the spillover, which spectrum normally has lines which fall close to, on both sides of, and directly on those of the desired signal.

SUMMARY OF THE INVENTION

In accordance with the device of the present invention, the above-described and other disadvantages of the prior art are overcome by providing a pseudonoise radar system with a word rate, $f_w$, greater than the maximum expected target doppler shift, $f_d$.

If such a system is employed, a filter having an upper cutoff frequency less than that of the first spillover line may be employed to attenuate spillover in addition to the apparatus described previously. The operation of this filter will be described in detail hereinafter.

It is another outstanding feature of the invention that a very large word rate may be employed to accommodate a very large doppler shift. This would be impossible with prior art systems because a large word rate can create an ambiguity in range indication. An ambiguity is created when the word time, i.e., the reciprocal of the word rate, is short in comparison to $(2 R_m)/c$, where $R_m$ is the maximum target range desired and c is the velocity of light. In accordance with the present invention, this ambiguity is eliminated by comparing transmitted code to received code for fine range and by changing the transmitted code bit frequency for coarse range. The ambiguity in the fine range indication is resolved by the coarse range indication.

It is an outstanding feature of the present invention that a bit frequency shift is employed to determine coarse range. The output so produced, however, is independent of transmitter bit frequency as a function of time. Rapid switching with loose control is thus possible. This, in turn, makes possible accurate range indications of rapidly moving targets.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
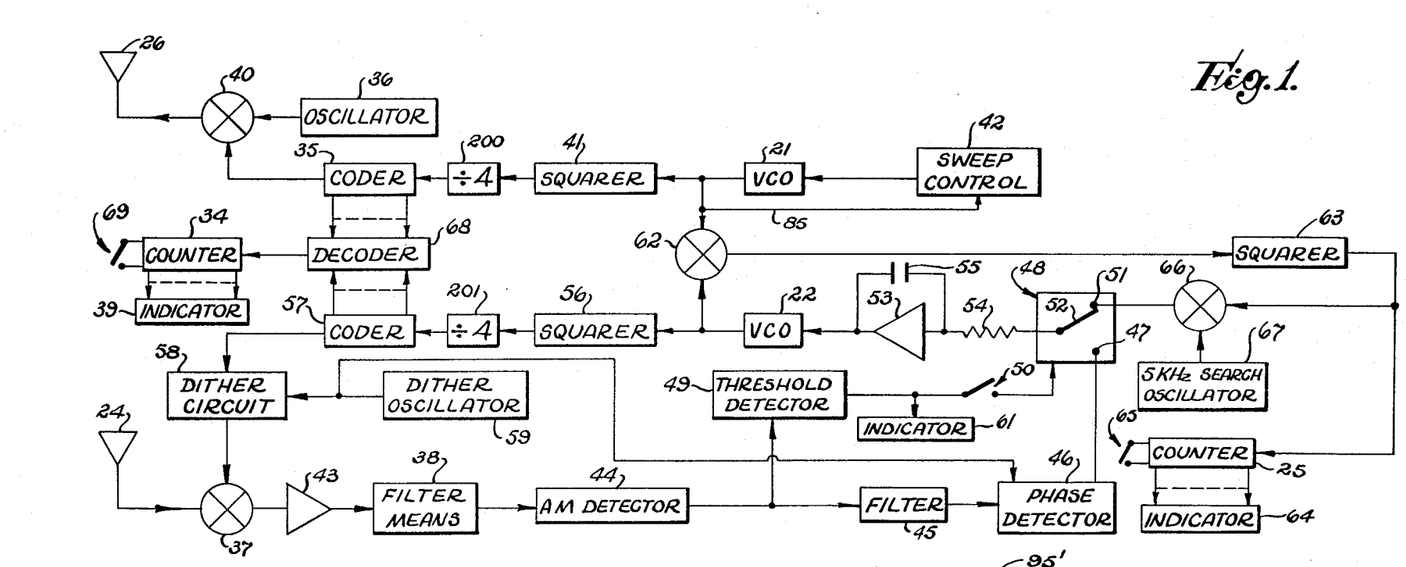
FIG. 1 is a block diagram of one embodiment of the present invention.

In the drawings, in FIG. 1, a carrier oscillator 36 is connected to a transmitting antenna 26 through a mixer 40. Mixer 40 receives another input from a transmitter coder 35. Coder 35 is supplied with a pulse train through a squarer 41 and a ÷4 frequency divider 200 from a voltage controlled oscillator (VCO) 21. The frequency of the output signal of VCO 21 is determined by the magnitude of the output signal of sweep control 42.

A mixer 37, an amplifier 43, a filter means 38, an amplitude modulation (AM) detector 44, a filter 45, and a phase detector 46 are connected in succession from a receiving antenna 24 to a contact 47 on a single pole, double throw switch 48. Switch 48 may be an electronic switch or a relay operated in accordance with the output signal of a threshold detector 49 when a switch 50 is closed.

Switch 48 has another contact 51 and a pole 52 which is connected to the input of an amplifier 53 by a resistor 54. A capacitor 55 is connected from the input to the output of amplifier 53.

A VCO 22, a squarer 56, a ÷4 frequency divider 201, a coder 57 and a dither circuit 58 are connected in succession from the output of amplifier 53 to another input of mixer 37.

Both of the coders 35 and 57 may be identical to some of the coders or code generators described in Chapter 4 of the book, *Modern Radar*, edited by Raymond Berkowitz (John Wiley Sons, Inc., New York, 1965). Both coders 35 and 57 are employed to produce maximal binary codes in the said book.

Dither circuit 58 receives an input from a dither oscillator 59. The output of the dither oscillator 59 is then applied to phase detector 46.

The output of threshold detector 49 is connected to an indicator 61.

The output of VCO 21 is not only impressed upon squarer 41, it is also impressed upon sweep control 42 and a mixer 62. Mixer 62 also receives a second input from the output of VCO 22.

The output of mixer 62 is impressed upon a binary counter 25 through a squarer 63. An indicator 64 is connected from counter 25. A switch 65 is connected to counter 25 for resetting that counter.

The output of squarer 63 is not only connected to counter 25, it is also connected to a mixer 66. Mixer 66 also receives a second input from a 5 KHz search oscillator 67. The output of mixer 66 is connected to contact 51 of switch 48.

Coders 35 and 57 are connected to a decoder 68. The output of decoder 68 is impressed upon a counter 34 having an indicator 39 connected therefrom. A switch 69 is connected to counter 34 for reset, as before.

The output of carrier oscillator 36 is a sine wave of a frequency, $f_o$.

The output of VCO 21 is a sine wave which changes in frequency, as will be described. The output of VCO 22 is also a sine wave which changes in frequency, as will be described.

All of the blocks shown in FIG. 1, by themselves, may be entirely conventional with the exception of sweep control 42 and decoder 68. However, the arrangement of even the conventional blocks is new.

The output of squarer 41 is a pulse train wherein the amplitude of each pulse is constant over the duration thereof. The amplitudes of the pulses referred to hereinbefore and hereinafter are otherwise immaterial. Moreover, the present invention is not limited to pulses of a constant amplitude over their duration.

The output of squarer 41 also includes the said pulses whose pulse widths are equal to the time between pulses. However, the invention is also not limited to this particular type of pulse. The output pulses of squarer 41 also have leading and trailing edges whose slopes are substantially vertical (infinite), although the invention is not limited to this particular kind of pulse.

The foregoing description of the output pulses of squarer 41 is also applicable to the output pulses of squarer 56. The difference between the pulse train outputs of squarers 41 and 56 is that the pulse repetition frequency (PRF) of the output pulses of squarer 41 is the same as the frequency of the output signal of VCO 21; however, the PRF of the output pulses of squarer 56 is equal to the frequency of the output signal of VCO 22.

Coders 35 and 57 include a plurality of flip-flops with gates connected thereto. The flip-flops constitute stages which may include any bistable device similar to a flip-flop. The last flip-flop in each coder produces a series of binary bits which have a serial pulse code determined by the designed-in code. The output codes of coders 35 and 57 are impressed upon mixer 40 and dither circuit 58, respectively.

The output codes of coders 35 and 57 are identical, but are normally out of phase. Each serial code is repeated in succession to form a succession of words, each word having the same serial code. Each stage in each of the coders 35 and 57 has a connection to decoder 68.

Counter 34 is a conventional binary counter that may be reset by a momentary closing of switch 69 which can supply an appropriate potential to the "0" input of each flip-flop or other binary device equivalent in counter 34. Indicator 39 may be simply a bank of lamps, each of which is illuminated when the "1" output of a corresponding flip-flop in counter 34 goes to the "1" state. Thus, there is one lamp in indicator 39 for each flip-flop in counter 34.

Counter 25, indicator 64 and switch 65 are ranged in a manner identical to counter 34, indicator 39 and switch 69. Indicator 64 indicates coarse range. Indicator 39 indicates fine range. If desired, a more sophisticated system may be employed to combine the output of counters 25 and 34 for a single range indication more accurate than that provided by indicator 64. Further, of course, a substantially more sophisticated indication system may be provided, if desired, than indicators 39 and 64.

The output of coder 57 is caused to jitter back and forth by dither circuit 58, and it is this modulated code that is impressed upon mixer 37. That is, the output of dither circuit 58 which is impressed upon mixer 37 is the same serial code at the output of coder 57. However, the serial code is oscillated back and forth in time at the frequency of dither oscillator 59. Dither oscillator 59 may be a free running multivibrator.

Filter means 38 may be simply a band pass filter having a lower cutoff frequency slightly above the carrier frequency, $f_o$, and an upper cutoff frequency slightly below the word frequency, $f_w$.

Filter 45 filters out only the dither oscillator modulation. Filter 45 is preferably a rather narrow band pass filter or a high pass filter having a lower cutoff frequency between the fundamental and second harmonics of the frequency of the output signal of dither oscillator 59. Inherent in the decoding of the incoming signal by applying the code output of dither circuit 58 to mixer 37, is the fact that the tracking loop follows with substantially zero error when the fundamental frequency of the output of dither oscillator 59 is absent from the output of detector 44. Thus, the magnitude of the dither fundamental is a function of the tracking loop error. Filter 45 is then employed to pass only the fundamental. That filter thus may be a band pass filter or low pass filter having a cutoff at least above the dither fundamental and below the second harmonic of the dither. Phase detector 46 produces a D.C. output voltage which varies in accordance with the error between the main code phase at the output of dither circuit 58 and the code on the signal received by receiving antenna 24.

Phase detector 46 may be entirely conventional and is of the type known as a synchronous demodulator.

The output of phase detector 46 is applied to switch contact 47 and thence to the input of VCO 22 via switch 48 when switch arm 52 is in engagement with contact 47.

The tracking loop from mixer 37 thus includes amplifier 43, filter means 38, detector 44, filter 45, phase detector 46, and switch contact 47. When switch arm 52 is in engagement with contact 47, the loop is completed through resistor 54, amplifier 53, VCO 22, squarer 56, coder 57, and dither circuit 58 back to mixer 37.

Threshold detector 49, indicator 61 and switch 50 are employed in operating switch 48 to cause the electronic tracking loop to go into operation. The output of detector 44 rises sharply when the main code phase at the output of dither circuit 58 is in phase with the code on the received signal. Indicator 61 then indicates that a received signal is available for tracking. Switch 50 may then be closed. Closure of switch 50 will then cause arm 52 to move to engagement with contact 47 and tracking will proceed until interrupted by the opening of switch 50.

VCO's 21 and 22 typically operate in the MHz range during tracking. Normally, they operate at identical frequencies. However, in order to search for a target signal, it is necessary that VCO 22 operate on a slightly different frequency so that the phase of the output code of coder 57 will move at, for example, an approximately constant slow rate until the main phase of the output code of dither circuit 58 is the same as that of the code on the received signal.

A frequency offset for VCO 22 is provided including the mixer 62. The output of mixer 62 is a sine wave of a frequency equal to the difference between the frequencies of the output signals of VCO 21 and VCO 22. The output of mixer 62 is applied to mixer 66 through squarer 63. Mixer 66 receives a 5 KHz offset from search oscillator 67. Thus, with switch arm 52 in engagement with contact 51 connected to the output of mixer 66, VCO 22 is driven to a frequency 5 KHz from that of the output signal of VCO 21.

Figure 2:
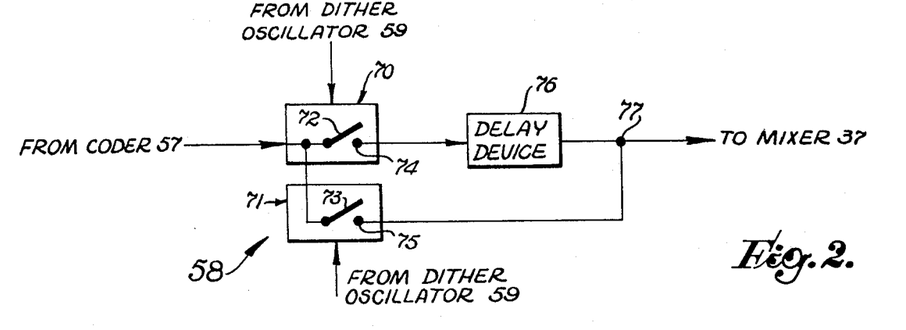
FIGS. 2, 3 and 4 are detailed block diagrams of three of the blocks shown in FIG. 1.

Dither circuit 58 is shown in FIG. 2 including switches 70 and 71. The output of coder 57 is connected to both poles 72 and 73 of switches 70 and 71, respectively.

Switch 70 has a contact 74. Switch 71 has a contact 75. A delay device 76 is connected from switch contact 74 to junction 77. Contact 75 is connected directly to junction 77. Junction 77 is connected to one input of mixer 37. Switches 70 and 71 may be electronic or otherwise.

As stated previously, dither oscillator 59 may be an astable multivibrator. It can thus produce two outputs 180° out of phase with each other. One of these outputs is supplied to switch 70. The other output is supplied to switch 71. Either output may be applied to phase detector 46.

From the foregoing, it will be appreciated that the output code of coder 57 is changed in phase at a dither frequency by alternately delaying it and not delaying it through the switches 70 and 71. Switches 70 and 71 are thus closed alternately. When switch 70 is closed, switch 71 is open, and vice versa.

Figure 3:
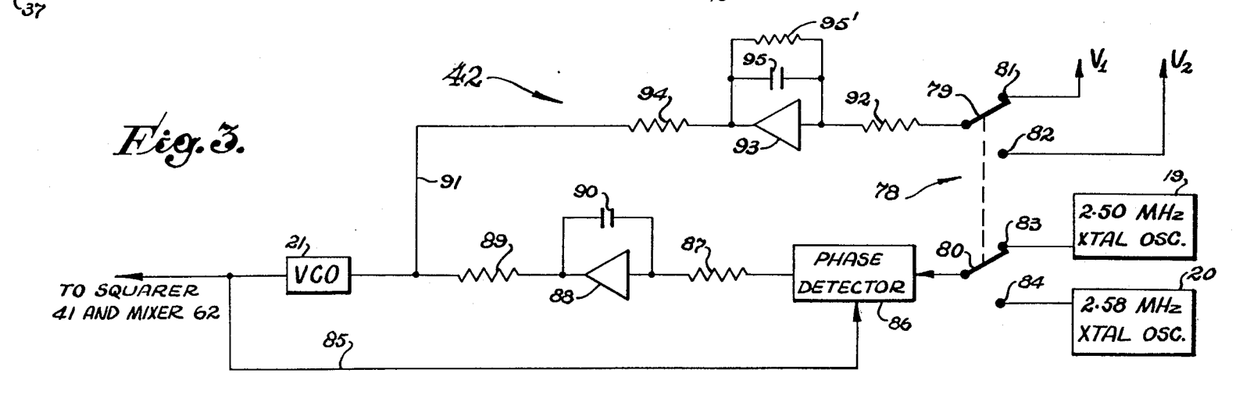

Sweep control 42 is shown in FIG. 3 including a 2.50 MHz crystal oscillator 19, and a 2.58 MHz crystal oscillator 20.

A double pole, double throw switch 78 having poles 79 and 80, and contacts 81, 82, 83 and 84 provides alternate inputs to the sweep control 42. The illustration of FIG. 3 includes more than sweep control 42 in that VCO 21 is redrawn for clarity. However, by comparison of FIGS. 1 and 3, it will be evident that VCO 21 not only supplies a feedback connection 85 to a sweep control mixer 86, but it also provides inputs to squarer 41 and mixer 62. Feedback connection 85 is shown in both FIGS. 1 and 3.

The purpose of sweep control 42 is to keep VCO 21 oscillating at a first constant frequency, and then to change the frequency of the output signal thereof to a second constant frequency different from the first.

Again, an electronic servo is employed including a loop beginning with a phase detector 86, and continuing with a resistor 87, an amplifier 88, a resistor 89, and VCO 21. A capacitor 90 is connected from the input to the output of amplifier 88.

When switch arm 80 is in engagement with contact 83, the said electronic servo of FIG. 3 drives VCO 21 accurately to 2.50 MHz. When arm 80 is in engagement with contact 84, the said electronic servo of FIG. 3 drives VCO 21 accurately to 2.58 MHz.

So that the electronic servo will not have to work so hard, supplemental voltages are applied to VCO 21 via a lead 91. These voltages are supplied from switch arm 79 through a resistor 92, an amplifier 93, and a resistor 94. A capacitor 95 is connected from the input to the output of amplifier 93. A resistor 95' is connected in parallel with capacitor 95.

Voltages $V_1$ and $V_2$ are applied to contacts 81 and 82, respectively. Voltages $V_1$ and $V_2$ bring the input to VCO 21 almost exactly to the voltages required to cause it to oscillate at the frequencies 2.50 MHz and 2.58 MHz., respectively.

Figure 4:
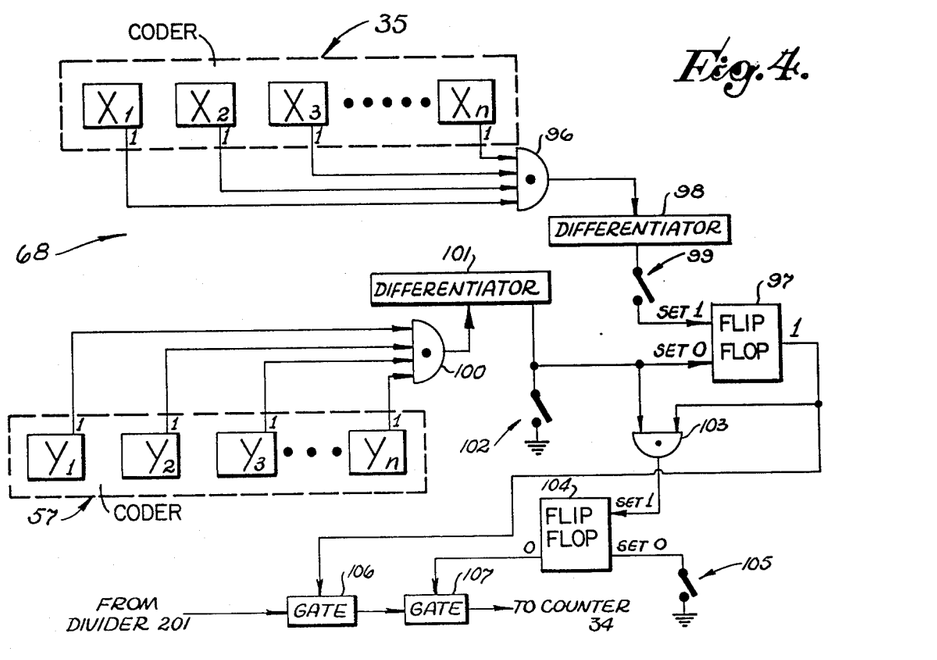

Decoder 68 is shown in FIG. 4 with coders 35 and 57. Coder 35 includes flip-flops $X_1, X_2, X_3 \ldots X_n$. Coder 57 includes flip-flops $Y_1, Y_2, Y_3 \ldots Y_n$. Receiver coder 57 has exactly the same number of flip-flops as the transmitter coder 35. All the "1" outputs of flip-flops X are connected as inputs to AND gate 96. The output of AND gate 96 is connected to the set "1" input of flip-flop 97 through a differentiator 98 and a switch 99.

Similarly, all the "1" outputs of flip-flops Y are connected as inputs to an AND gate 100. The output of AND gate 100 is connected to the set "0" input of flip-flop 97 through differentiator 101. The set "0" input of flip-flop 97 is connected to ground through a switch 102. The "1" output of flip-flop 97 is connected to one input of AND gate 103. The output of differentiator 101 is also connected to another input of AND gate 103. The output of AND gate 103 is connected to the set "1" input of flip-flop 104. The set "0" input of flip-flop 104 is connected to ground through a switch 105. The "1" output of flip-flop 97 is connected to a gate 106. The "0" output of flip-flop 104 is connected to a gate 107. The output of divider 201 is passed at least a portion of the time, through gates 106 and 107 to counter 54. Note that the output of divider 201 is connected to the input of gate 106. Dividers 200 and 201 improve resolution.

As stated previously, coders 35 and 57 produce maximal codes. It is inherent in a maximal code that during one, and only one, bit interval the states of all the X flip-flops at the "1" outputs thereof, or at the "0" outputs thereof, are high simultaneously. The same is true for the outputs of all the Y flip-flops. However, in each case, this happens only once during each word interval. In other words, if connected, gate 96 will produce one pulse per word. The same is true of gate 100. However, due to the fact that a delay is incurred by transmitting a signal and having it reflected from a target, the pulse outputs of AND gates 96 and 100 will not occur at the same time for a target of a given finite range. Further, if the word interval, i.e., the reciprocal of $f_w$, is longer than twice the maximum target range which need be detected, divided by the velocity of light, the phase difference between the output pulse of gate 100 from that of the output pulse of gate 96 will be directly proportional to target range. However, as will be explained hereinafter, it is often desirable to make the word frequency much higher so that the first line in the noise power spectrum of a pseudonoise coded signal lies beyond, that is higher than, the maximum expected doppler. When this happens, the said word interval becomes shorter than $(2R)/c$ where R is target range and c is the velocity of light. In this case, the phase differences of gates 96 and 100 present an ambiguous range indication. That is, the pulse at the output of gate 100 may slip whole word intervals. Thus, the phase difference in this case may indicate range as a fraction of an interval whereas the accurate range is directly proportional to some integral number of word intervals plus the said fraction. For this reason, coarse range indicator 64 is employed. Indicator 39 is thus a fine range indicator.

Differentiator 98 simply produces no output except on the leading edge of the output pulse of gate 96.

In the operation of the decoder 68 shown in FIG. 4, switch 102 is momentarily closed to reset flip-flop 97 to the "0" state. Switch 105 is then closed momentarily to set flip-flop 104 to the "0" state. After searching has taken place, indicator 61 illuminated, switch 50 closed, and the tracking input of FIG. 1 operated by moving switch arm 52 into engagement with contact 47, the resetting of flip-flops 97 and 104, as described previously, switch 99 is closed. After switch 99 is closed, the leading edge of the first pulse at the output of AND gate 96, through switch 99, will set flip-flop 97 to the "1" state. Note that gate 107 is normally open and is only closed when flip-lop 104 is set to the "1" state. When flip-flop 97 is set to the "1" state, gate 106 also opens, and pulses from the output of divider 201 are passed by both gates 106 and 107 to counter 34. When a pulse is generated at the output of AND gate 100, differentiator 101, at the leading edge of the next succeeding output pulse from gate 100, sets flip-flop 97 to the "0" state. At the same time, AND gate 103 sets flip-flop 104 to the "1" state, and gate 107 is thereby closed. Gate 107 does not then reopen until the decoder 68 is reoperated in accordance with the procedures set forth hereinabove.

OPERATION

With switch arm 52 in the position shown in FIG. 1, the system is normally operated at a bit frequency of 2.50 MHz, switch arms 79 and 80 being in the positions shown in FIG. 3. In this case, the 5 KHz frequency offset between VCO 21 and VCO 22 provided by search oscillator 67 causes the output code of coder 57 to slip with respect to the code of the received signal at a substantially constant rate. When the main phase of the output code of dither circuit 58 is close to the phase of code on the received signal, indicator 61 will be illuminated, and switch 50 may be closed. Switch arm 52 will then be moved into engagement with contact 47. At this point, any slippage of the output code of counter 57 and the code on the received signal will be evidenced by an output from detector 44 at the fundamental of the frequency of the output signal of dither oscillator 59. Phase detector 46 will then undertake to correct any slippage by changing the frequency of the output signal of VCO 22.

Thus far, the system of FIG. 1 has been described in the tracking mode. Fine range may be measured at any desired frequency. For example, fine range may be measured at 2.50 MHz bit rate. If so, as stated previously, switches 102 and 105 in FIG. 4 are momentarily closed in succession. Switch 99 is then closed and indicator 39 will indicate fine range immediately.

For coarse range, switch 65 may be momentarily closed in FIG. 1 to reset counter 25. Switch 78 is then operated to cause arms 79 and 80 to be put into engagement with contacts 82 and 84, respectively. Almost immediately after switch 78 is so actuated, indicator 64 will indicate coarse range.

THEORY OF OPERATION

Figure 5:
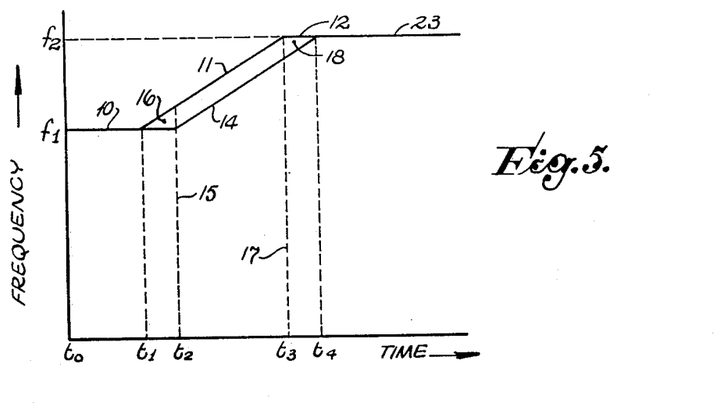
FIGS. 5, 6, 7 and 8 are diagrams illustrating the operation of the invention.

In FIG. 5, a first solid line segment 10 joins points $t_0$, $f_1$ and $t_1$, $f_1$. A second solid line segment 11 joins points $t_1$, $f_1$ and $t_3$, $f_2$. A third solid line segment 12 joins points $t_3$, $f_2$ and $t_4$, $f_2$. A fourth solid line segment 13 joins points $t_1$, $f_1$ and $t_2$, $f_1$. A fifth solid line segment 14 joins points $t_2$, $f_1$ and $t_4$, $f_2$. A dotted line 15 at $t_2$ forms a triangle 16 with line segment 13 and a portion of line segment 11. A dotted line 17 at $t_3$ forms a triangle 18 congruent with triangle 16 with line segment 12 and a portion of line segment 14.

The frequency of oscillator 19 in FIG. 3 may be $f_1$ and the frequency of oscillator 20 in FIG. 3 may be $f_2$ (or vice versa). The frequency of VCO 21 may thus follow line segments 10, 11 and 12 and the horizontal line 23 which extends from point $t_4$, $f_2$ at frequency $f_2$. The frequency of VCO 22 will follow line segments 10, 13, 14 and 23.

The relationship, $t_2 - t_1 = (2R)/c$, is true because the receiving antenna 24 does not "see" the change in the frequency of the VCO 21 until after the delay due to the finite propagation velocity to and from the target. The factor of 2 is needed because the wave travels both to and from the target and not merely to it. Hence, R is the target range, and c is the velocity of light. Similarly, $t_2 - t_1 = t_4 - t_3$. Line 23 and line segments 10 and 13 are horizontal. The figure bounded by line segments 11, 12, 13 and 14 is therefore a parallelogram.

In accordance with the foregoing, a change in the frequency of VCO 21 results in a change in the frequency of VCO 22. VCO 22 catches up at point $t_4$, $f_2$ in frequency. However, the time delay of propagation causes a phase difference to exist between the output of VCO 22 and the output of VCO 21. The VCO 22 never catches up in phase. The total phase change, $\phi$, in cycles is then:

$$\phi = \int_{t_1}^{t_4} (f_t - f_r) dt \quad (1)$$

where,
$f_t$ is the frequency of VCO 21, and
$f_r$ is the frequency of VCO 22.

$$\phi = \int_{t_1}^{t_4} f_t dt - \int_{t_1}^{t_4} f_r dt \quad (2)$$

$$\int_{t_1}^{t_4} f_t dt = \int_{t_1}^{t_3} f_t dt + (t_4 - t_3) f_2 \quad (3)$$

$$\int_{t_1}^{t_4} f_r dt = (t_2 - t_1) f_1 + \int_{t_2}^{t_4} f_r dt \quad (4)$$

However, if $f_t = f(t)$, any function of time, t, then $f_r = f(t - [t_2 - t_1])$. Further, $t_4 - t_2 = t_3 - t_1$. Thus, $$\int_{t_1}^{t_3} f_t dt = \int_{t_2}^{t_4} f_r dt \quad (5)$$

Substituting (5) in (3) and subtracting (4) therefrom, the following is found:

$$\phi = (t_4 - t_3) f_2 - (t_2 - t_1) f_1 \quad (6)$$

However, $t_4 - t_3 = t_2 - t_1$. Thus, $$\phi = (t_2 - t_1)(f_2 - f_1) \quad (7)$$

$$t_2 - t_1 = (2R)/c \quad (8)$$

Substituting (8) in (7), $$\phi = \frac{2R(f_2 - f_1)}{c} \quad (9)$$

$$R = \frac{c\phi}{2(f_2 - f_1)} \quad (10)$$

Equation (10) tells us that R is directly proportional to $\phi$. All the terms on the right hand side of equation (10) are known. More important, the integrals of the right hand sides of equations (3) and (4) cancel out by subtraction because of equation (5), and $\phi$ is wholly independent of what function of time, f(t) is represented by $f_t$. That is, line segment 11 may be a straight or curved line connecting points $t_1$, $f_1$ and $t_3$, $f_2$.

Figure 6:
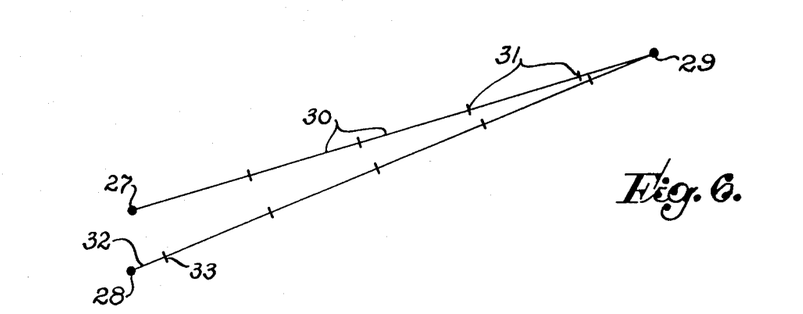

Another way to explain the mechanism in terms of path length. For example, transmitting antenna 26 is indicated at a point 27 and receiving antenna 24 is indicated at a point 28 in FIG. 6. In FIG. 6, the target is indicated at a point 29. The antennas 24 and 26 are shown spaced apart for the purpose of illustration only and are effectively nearly at the same point. The incident and reflected waves travel along the path of line segments 30, where the path length is divided therein by cross bars 31. The total path length, 2R, to and from the target is thus somewhat over nine times the length of one line segment 30. All of the line segments 30 are of the same length except the small line segment 32 between cross bar 33 and point 28.

Assume that the length of one line segment 30 is $\lambda_1$, where $\lambda_1 = c/f_1$.

Note then that the path length is equal to a $\lambda_1$.

When $f_t = f_2$, the path length will be equal to b $\lambda_2$, where b is larger than a, and $\lambda_2 = c/f_2$.

If the target range is substantially constant between $t_1$ and $t_4$, $$R = (a\lambda_1)/2 = (b\lambda_2)/2$$

Since the difference between a and b appears to be solely a function of the starting and ending conditions $\lambda_1$ and $\lambda_2$, it could, therefore, be expected that $\phi$ would be independent of $f_t = f(t)$ and $f_r = f(t - [t_2 - t_1])$.

Another way to look at the same physical mechanism is that the transmitter must push $\phi$ additional cycles into the path when the transmitted frequency increases from $f_1$ to $f_2$. Thus the received frequency can finally arrive at $f_2$ at $t_4$, but the receiver can never catch up on phase because the $\phi$ wavelengths are, in effect, suspended or "hung up" in space.

The outputs of counters 25 and 34 may be combined in a single indicator, if desired. However, a scale factor is involved. From equation (10), $$R_c = \frac{c \phi_c}{2(f_2 - f_1)} \quad (11)$$

Fine range may be measured at any frequency, but it must be measured at some one frequency. Assume that the one frequency is $f_1$. Then, $$R_f = \frac{c \phi_f}{2 f_b} \quad (12)$$

where,
$R_c$ is coarse range,
$\phi_c$ is coarse range count,
$R_f$ is fine range,
$\phi_f$ is fine range count, and
$f_b$ is the oscillation frequency of VCO 22 divided by four.

In order to combine (11) and (12) for the most accurate range indication, find $$(2R_c)/\lambda_1 = \phi_i + \phi_p \quad (13)$$

where,
$\phi_i$ is a positive integer, and
$0 \leq \phi_p < 1$.

Then find the total accurate count, $\phi_t$, by $$\phi_t = \phi_i f_b + \phi_f \quad (14)$$

Then find the total accurate range, $R_t$, by $$R_t = \frac{c(\phi_i f_b + \phi_f)}{2 f_b} \quad (15)$$

THE PROBLEM SOLUTION

Transmitter coder 35 is constructed to produce a word rate which is always at least greater than the maximum expected doppler shift, $f_d$. The doppler shift referred to above is the center frequency of the reflected wave minus $f_o$, i.e., the shift in frequency which is produced by a moving target.

Figure 7:
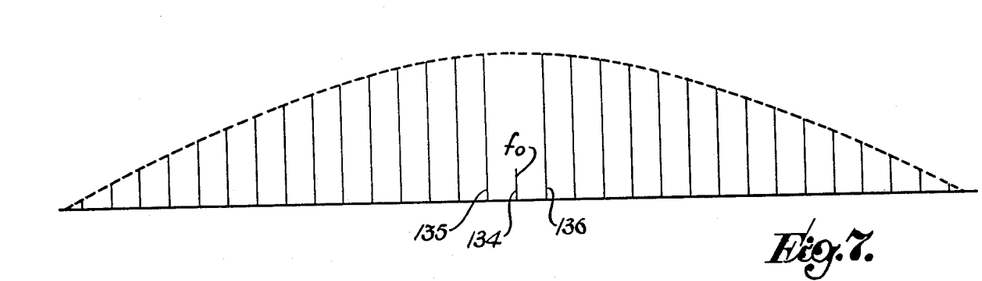

The reasons for the conditions described above will now be explained. When a radio frequency (RF) signal is substantially pure in frequency, it will have a very small spread (narrow spectrum). However, pseudonoise coding will spread out the carrier power as shown in FIG. 7. The target may be considered to be momentarily stationary if the slope of line segment 11 in FIG. 5 is large. The term, $f_o$, is defined as the frequency of the output signal of carrier oscillator 36. Further, the line 134 will have an amplitude of 20 (log N) db down from the carrier amplitude before modulation, where N is the number of bits in each word. Lines 135 and 136, on opposite sides of line 134, will each have an amplitude of 10 (log N) − 3 db down from the carrier amplitude. Each pair of adjacent lines are located apart a spread of $f_w$, the word frequency. The envelope of the lines is given by the familiar function sin x/x.

Figure 8:
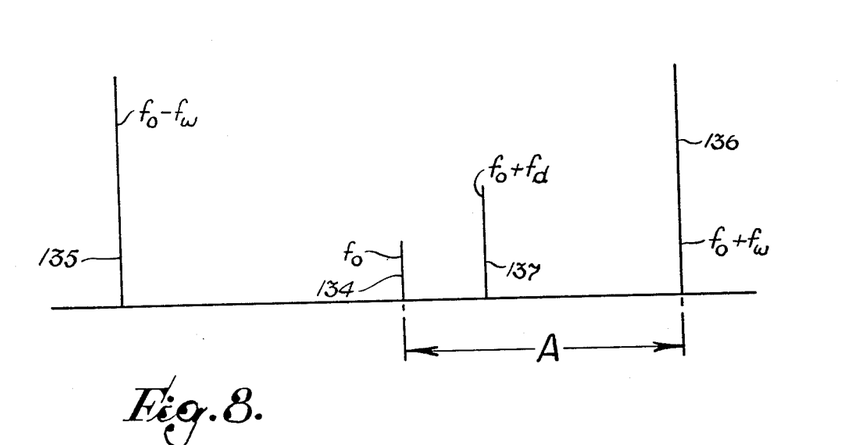

At the output of mixer 37, spillover lines will still appear at 134, 135 and 136 as shown in FIGS. 7 and 8. Spillover is the electromagnetic energy transmitted directly from the transmitting antenna 26 to the receiving antenna 24. Spillover is thus not reflected from the target. The doppler frequency of a reflected wave may be located at 137.

Note will be taken that if the bandspread A, which is $f_w$, is larger than the maximum expected doppler shift for which the apparatus should be operable (i.e., $f_d$), line 137 may always be distinguished in frequency from lines 134 and 136 by the band pass or low pass filter means 38. The low pass filter may be used with a D.C. blocking capacitor if the line 137 is heterodyned down to $f_d$. In the case of the bandpass filter, it should have a passband at least slightly less than A with edges in between lines 134 and 136. The manner in which this condition is related to the apparatus of the present invention is that $f_w$ must be larger than $f_d$. It is by the condition of word rate that it is possible to usefully employ filter 38.

Notwithstanding the foregoing, for reasonable values of $f_d$, it may be necessary to make $f_w$ relatively large. Thus, it is not possible, in some practical cases, to obtain range information from a reflected wave if the time from transmission to reception is long in comparison to a word interval, that is, the reciprocal of $f_w$. For this reason, a single indicator may indicate only a fraction of the range of a target. This fraction will be in addition to some whole integral number of word intervals times the velocity of light. This fraction is indicated by indicator 39. For this reason, use is made of the change in the frequency of VCO 21. The frequency change makes possible an "accurate range." Indicator 39 indicates accurate fine range.

When mixer 37 demodulates the received signal, it collapses the broad power spectrum thereof into substantially the single line 137. However, this is because the electronic servo of FIG. 1 shifts the mean phase of the output code of dither circuit 58 to be out of phase with the output code of coder 35 and in phase with the code on the received signal. The code phase shift is thus $(2R)/c$ in time. The transmitter is obviously always much closer to the receiver than the target, and the phase shift due to propagation is thus much less. That is, $(2R_s)/c << (2R)/c$ when $R_s << R$, where R is the target range and $R_s$ is the distance between the transmitting and receiving antennas.

In accordance with the foregoing, mixer 37 does not decode the spill-over and it remains in a large band wholly outside the passband of filter 38, whereas line 137 is passed by filter 38.

In accordance with the foregoing, it will be noted that the output of counters 25 and 34 may be employed in a control function such as gun laying of any other similar or unlike system. That is, the device of the present invention is not limited to range indication. The outputs of counters 25 and 34 need not provide any indication at all, but only provide control signals or analogs of target range.

If desired, VCO 21 and VCO 22 may be oven controlled.

One or more or all of the switches shown in all of the drawings may be made manual or automatic, if desired.

Although all of the "1" outputs of flip-flops X and Y shown in FIG. 4 are employed with gates 96 and 100, respectively, it is to be understood that, just as well, another coding system may be employed. That is, for example, all of the "0" outputs of flip-flops X may be connected to AND gate 96, and all the "0" outputs of flip-flops Y may be connected to AND gate 100.

Much of the logic described herein may be changed. For example, the "1" output of flip-flop 97 may be connected to the input of an AND gate. The "0" output of flip-flop 104 may be connected to the same AND gate. The said AND gate might be connected to only one gate between oscillator 108 and counter 34.

Depending upon the manner in which the system of FIG. 1 is constructed, the number of cycles at the output of mixer 62 may be large, if desired, depending upon the accuracy required for the range of ranges to be indicated.

If more sophisticated indicators are desired, linear indications of conventional linear measure may be provided, if desired. That is, a single indicator combining the outputs of counter 25 and 34 may be employed to indicate range in miles. Alternatively, indicators 39 and 64 may indicate range in miles.

From the foregoing, it will be appreciated from FIG. 1 that between distance $t_2$ and $t_3$, the difference between the frequency of the output of VCO 21 and the frequency of the output of VCO 22 is constant. This means that a range indication may be obtained simply by sampling that frequency and holding it.

Note that the vertical leg of triangle 16 is the difference frequency, Equation (3) reads:

$$e = (2R \tan \theta)/c$$

Thus, $$R = ce/(2 \tan \theta)$$

In other words, c, e and $\theta$ are known or R is directly proportional to e.

All switches disclosed or referred to herein may or may not be mechanical or transistor or other electronic switches, as desired.

Note will be taken that it is one outstanding feature of this invention that the total of the phase shift, $\phi$, is completely independent of the manner in which the transmitter bit frequency is increased from $f_1$ to $f_2$. This means that the rate of change of the transmitter bit frequency may be very large and the range of a rapidly moving target repeatedly determined without substantial error. The rate of change of frequency is only limited by the maximum tracking rate of the receiver. Ranging for fast moving targets is thus possible. The range of a spacecraft moving at a supersonic speed on reentry may thus be accurately determined.

In FIG. 5, note that $f_2$ may be less than $f_1$ and the slope of line segment 11 negative. The invention will then work equally as well as described hereinbefore.

Again in FIG. 5, note that $f_t$ has a frequency for a period immediately prior to period $t_1$ to $t_2$ which is constant at $f_1$. The said prior period is preferably at least as large as $t_p$, where, $t_p = (2R_m)/c$ $R_m$ is the maximum range desired, and c is the velocity of light.

Similarly, lines 12 and 23 are preferably straight and horizontal for at least the same length of time, $t_p$.

What is claimed is:

1. In a pseudonoise radar system, the combination comprising: a transmitter voltage controlled oscillator (VCO); a receiver VCO, a carrier oscillator; a transmitting antenna; a receiving antenna; a first mixer connected to said transmitting antenna from said carrier oscillator; a transmitter coder connected from said transmitter VCO to said first mixer; first means including a servo loop having a second mixer having first and second inputs and an output, said receiving antenna being connected to the first input of said second mixer, said loop including second means connected from said receiver VCO to impress a code on said second input of said second mixer of a mean bit frequency directly proportional to the frequency of the output signal of said receiver VCO, said loop including third means connected from said second mixer output to the input of said receiver VCO to maintain the mean bit code appearing at the second input of said second mixer in phase with that on the signal received by said receiving antenna; a third mixer having first and second inputs connected, respectively, from the outputs of said transmitter and receiver voltage controlled oscillators; fourth means to sweep the frequency of said transmitter VCO between first and second different limits; and fifth means to count the number of cycles appearing at the output of said third mixer.

2. The invention as defined in claim 1, wherein said fourth means maintains the frequency of said transmitter VCO constant for a period, $t_p$, before and after the change therein is made, wherein $t_p = (2R_m)/c$ $R_m$ is the maximum range desired, and c is the velocity of light, said constant frequencies having magnitudes different from each other.

3. The invention as defined in claim 2, wherein sixth means are provided which are actuable to reset said fifth means to zero before the frequency of said transmitter VCO is changed.

4. The invention as defined in claim 1, wherein sixth means are provided which are actuable to reset said fifth means to zero before the frequency of said transmitter VCO is changed.

5. The invention as defined in claim 1, wherein said third means includes a single pole, double throw switch having first and second contacts, sixth means connected from said pole to said receiver VCO, seventh means connected from said second mixer to said first contact, a fourth mixer connected from said third mixer output to said second contact, and a search oscillator connected to said fourth mixer.

6. The invention as defined in claim 1, wherein said fifth means includes a squarer and a digital pulse counter connected in that order from the output of said third mixer.

7. The invention as defined in claim 6, wherein said fifth means includes means actuable to reset said counter before the frequency of said transmitter VCO is changed, and sixth means to indicate visually the number of pulses counted by said counter.

8. The invention as defined in claim 1, wherein said second means includes a receiver coder, each of said coders having the same number of n flip-flops, first and second AND gates for said transmitter and receiver coders, respectively, said first AND gate having inputs from all of the "1" outputs of all of the flip-flops in said transmitter coder, said coders both being connected to produce the same maximal code, said second AND gate having inputs from all of the "1" outputs of all of the flip-flops in said receiver coder, and sixth means connected from both of said AND gates for producing a signal directly proportional to the phase difference between the pulses appearing at the outputs of said AND gates.

9. A frequency sweep circuit, said circuit comprising: a double pole, double throw switch having first and second poles, and first and second contacts for each pole; a voltage controlled oscillator (VCO) having an input and an output, first means connected between said first pole and said VCO input; means to supply a first potential to said first pole first contact; means to supply a second potential to said first pole second contact, said first potential being lower than said second potential; first and second crystal oscillators having lower and higher frequencies, respectively, said first and second crystal oscillators being connected to said first and second contacts, respectively, of said second pole, said switch being constructed to cause said poles to engage both of said first contacts at the same time, and to cause said poles to engage both of said second contacts at the same time; a phase detector having a first input connected from said second pole, and a second input connected from said VCO output; said phase detector having an output; and means connecting the output of said phase detector to the input of said VCO.

* * * * *